(12) United States Patent
Sharma et al.

(10) Patent No.: US 8,252,381 B1
(45) Date of Patent: Aug. 28, 2012

(54) MOLECULAR COATING ON METAL SURFACES

(75) Inventors: Sunity K. Sharma, Fremont, CA (US); Ravi Shankar, New Delhi (IN); Jaspreet S. Dhau, Menlo Park, CA (US); Naishadh K. Saraiya, San Jose, CA (US)

(73) Assignee: CSL, Inc., Santa Clara, CA (US)

( * ) Notice: Subject to any disclaimer, the term of this patent is extended or adjusted under 35 U.S.C. 154(b) by 1260 days.

(21) Appl. No.: 11/784,507

(22) Filed: Apr. 6, 2007

(51) Int. Cl.
*C23C 22/48* (2006.01)

(52) U.S. Cl. ............... 427/384; 427/388.1; 148/248; 148/252; 148/274

(58) Field of Classification Search ............ 427/309, 427/384, 388.1; 148/248, 252, 274
See application file for complete search history.

(56) References Cited

U.S. PATENT DOCUMENTS

| | | | | |
|---|---|---|---|---|
| 4,087,582 | A | * | 5/1978 | Shirahata et al. ............ 428/333 |
| 4,666,528 | A | * | 5/1987 | Arrington et al. ............ 510/245 |
| 5,385,616 | A | * | 1/1995 | Dougherty et al. .......... 148/248 |
| 5,667,662 | A | * | 9/1997 | Sonnenberg et al. ......... 205/162 |
| 2002/0014255 | A1 | * | 2/2002 | Parrish et al. ................. 134/1 |
| 2003/0060372 | A1 | * | 3/2003 | Fan et al. ..................... 507/117 |
| 2004/0076833 | A1 | * | 4/2004 | Sanduja et al. ............ 428/422.8 |
| 2004/0163669 | A1 | * | 8/2004 | Brueckner et al. ............ 134/1.2 |

OTHER PUBLICATIONS

Adenier, Alain et al., "Grafting of Nitrophenyl Groups on Carbon and Metallic Surfaces without Electrochemical Induction", Chem. Mater., vol. 17, No. 3, pp. 491-501, 2005.

ASTM Standard G 85-98, "Standard Practice for Modified Salt Spray (Fog) Testing", ASTM International, West Conshohocken, PA.

ASTM Standard B 117-73 (Reapproved 1979), "Standard Method of Salt Spray (Fog) Testing", ASTM International, West Conshohocken, PA.

Bhaskaran, R. et al., "Global Cost of Corrosion—A Historical Review", ASM Handbook, vol. 13B, Corrosion: Materials, pp. 621-622, 2005.

Durkee, John B., Cleaning Times "The Future of Metal Finishing", Metal Finishing, vol. 104, Issue 9, pp. 60-62, Sep. 2006.

Durkee, John B., Cleaning Times "Are You Ready for Superhydrophobicity?", Metal Finishing, vol. 104, Issue 10, pp. 45-47, Oct. 2006.

Hong-Bo, Xie et al., "A High-Quality Chromium-Free Passivation Process for Copper and its Alloys", Journal of Applied Surface Finishing, vol. 1, No. 1, pp. 94-98, 2006.

Saraiya, Naishadh K. et al., "Non-Cadmium Composite Coating", U.S. Appl. No. 11/588,725, filed Oct. 26, 2006.

\* cited by examiner

*Primary Examiner* — Timothy Meeks
*Assistant Examiner* — Nathan T Leong
(74) *Attorney, Agent, or Firm* — Nixon Peabody LLP

(57) ABSTRACT

A coated metal surface is disclosed, with a chemically-bonded film of long-chain organic groups. Such coating may be hydrophobic, and therefore repel the presence of water. This allows the surface to resist corrosion and surface oxidation, without diminishing the desired metallic characteristics of the surface. Further disclosed are methods for applying and coating on various substrates. Such coating may be advantageously applied to protect metals from corrosive environments such as air, water, chemicals, and bodily fluids.

17 Claims, 4 Drawing Sheets

SUBSTRATE WITHOUT MOLECULAR COATING

SUBSTRATE WITHOUT MOLECULAR COATING

MOLECULAR COATING ON METAL SURFACES

CROSS-REFERENCE TO RELATED APPLICATIONS

Not Applicable.

TECHNICAL FIELD

The subject matter described relates generally to methods of coating metallic surfaces, particularly metallic surfaces containing Group VIIIB elements, with long-chain organic groups, to render them hydrophobic while also retaining their important metallic properties.

BACKGROUND

Except for noble metals such as gold and platinum, metal surfaces generally have a tendency to corrode when exposed to the environment. The corrosion of metals is generally undesirable, because a corroded metal surface may have decreased electrical and thermal conductivity, luster, aesthetic appeal, and mechanical properties such as tensile strength. Billions of U.S. dollars per year are spent protecting, preventing, or retarding corrosion of metals. For example, it is estimated that the direct cost of corrosion to United States industries is about $276 billion annually. When indirect costs are included, such as spillage, production loss, productivity loss, etc., the total rises to $552 billion. See R. Bhaskaran, N. Palaniswamy & N. S. Rengaswamy (2005), "Global Cost of Corrosion—A Historical Review, in *Corrosion: Materials*, ASM Handbook vol. 13B, p. 619, ASM International, Materials Park Ohio. As a result, there has been great interest in formulating better ways to protect metal surfaces from corrosion. See, e.g., John B. Durkee (September 2006) "The Future of Metal Finishing," *Metal Finishing*, vol. 104, no. 9, pp. 60-62.

Different metals corrode in different ways. For example, aluminum, copper, and nickel surfaces usually form an oxide coating after exposure to the environment. The surfaces of other metals, such as alloys of iron, may form rust. The severity of corrosion on metal surfaces depends on the ambient environment and the atmospheric conditions. Although metal surfaces may be exposed to a variety of corrosive environments and chemicals, in most applications, the metal surfaces are exposed to air, which is a source of oxygen and humidity. The oxygen in the air reacts with the metal surface to form the oxide layer, but oxygen alone is not usually sufficient to initiate corrosion in the absence of water. The humidity in the air, however, acts as a carrier of reactive materials, such as dissolved acids, alkali, or salts, to the metal surface, where they contribute to faster oxidation. Once the possibility of water contacting the surface of the metal is reduced, the likelihood of corrosion in air is greatly diminished.

One method of protecting metal surfaces against corrosion is electroplating. One may prevent or retard corrosion by electroplating the metal with a thin layer of non-porous noble metals such as gold or platinum. Protection of the surface may also be achieved by electroplating the surface with such metals as cadmium or chromium, which resist oxidation because of their atomic configuration. Various methods of electroplating are well-known. For example, see Mordechay Schlesinger and Milan Paunovic, eds., *Modern Electroplating* (4th ed.), Wiley-Interscience Publication, 2000.

Another method for preventing or retarding corrosion of metals is to use a bulk coating technique to brush, spray, or otherwise apply a relatively thick layer of a compound onto a metal surface that adheres to it through physical bonds and prevents the penetration of moisture and/or oxygen. The surface may be coated with an organic compound, which can prevent the penetration of oxygen, and if it is hydrophobic, it can repel moisture as well. Ceramic coatings have also been used in a similar way to cover the metal surface and impede the approach of air and moisture. See, e.g., Yigal Blum & Gregory A. McDermott, *Dehydrocoupling Treatment and Hydrosilylation of Silicon-containing Polymers, and Compounds and Articles Produced Thereby*, U.S. Pat. No. 5,990,024 (issued Nov. 23, 1999). Various kinds of paint may contain mixtures of organic and/or inorganic compounds that may be coated on surfaces to prevent corrosion. Bulk organic and ceramic coatings are typically several thousandths of an inch thick, and generally convert the metal surface into an electrical insulator.

Another method for preventing or retarding corrosion is to graft organic molecules onto the metal surface, thus creating a thin layer or film that blocks the penetration of oxygen and moisture from the environment. For example, 1,2,3-benzotriazole has been incorporated on a copper surface using an oxidation accelerator for protection against surface oxidation and corrosion. See Xie Hong-Bo & Zhang Lai-Xiang (2006), "High Quality Chromium-Free Passivation Process for Copper and its Alloys", *Journal of Applied Surface Finishing*, 1: 94-98. Similarly, nitrophenyl groups have been grafted on metal surfaces via the reactivity of a diazonium group. See Alain Adenier et al., (2005) "Grafting of Nitrophenyl Groups on Carbon and Metallic Surfaces without Electrochemical Induction, *Chemistry of Materials*, 17:491-501. Grafting organic molecules onto the surface can create a very thin layer, typically a mono-molecular layer, Such a thin layer of coating retains electrical conductivity on the surface of the metal.

Yet another method for reducing surface corrosion is to create nanostructures on the surface that repel droplets of water and prevent them from making significant contact with the surface, thus imparting corrosion resistance. See, e.g., John B. Durkee, (2006) "Are You Ready for Superhydrophobicity?" *Metal Finishing*, vol. 104, no. 10, pp. 45-47.

BRIEF SUMMARY

The present disclosure relates to methods of depositing a chemically bonded coating of long-chain organic groups on a metal surface to make it hydrophobic in nature, thus providing adequate protection against corrosion and surface oxidation. Various embodiments are possible, a number of which are exemplified here.

In one embodiment of the present disclosure, there is provided a metal substrate coated with a hydrophobic material comprising a metal substrate including a surface and a plurality of organic molecular groups, each organic molecular group having a long-chain chemical structure comprising a carbon backbone including at least one carboxyl group, wherein the organic molecular groups are bound to the surface by a chemical bond between the surface and the carboxyl group or groups.

In another embodiment of the present disclosure, there is provided a method for creating a hydrophobic coating on a metal substrate, comprising the steps of cleaning a surface of the metal substrate, activating the surface by exposing it to an oxidizing agent, and binding on the surface a plurality of organic molecular groups, each organic molecular group having a long-chain structure and comprising a carbon backbone including at least one carboxyl group, wherein the organic molecular groups are bound to the metal surface by a chemical bond between the surface and the carboxyl group or groups.

BRIEF DESCRIPTION OF THE DRAWINGS

The accompanying drawings, which are incorporated into and constitute a part of this specification, illustrate one or more exemplary embodiments of the present invention and, together with the detailed description, serve to explain the principles and exemplary implementations of the invention.

In the drawings.

DETAILED DESCRIPTION

Figure 1:
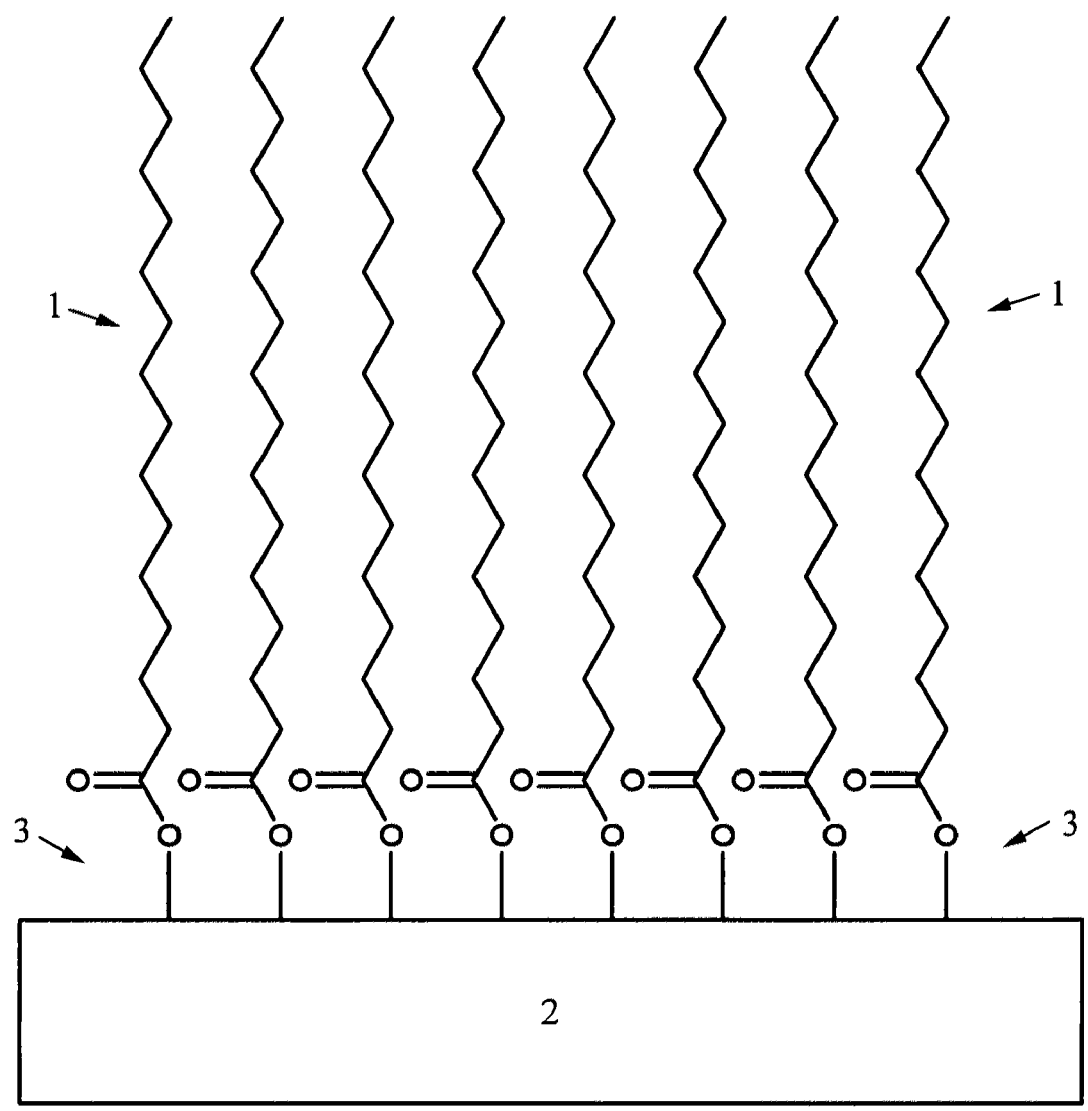
FIG. 1 illustrates a metal surface coated with long-chain organic groups, where the long-chain organic groups are chemically bound to the surface.

Various example embodiments of the present inventions are described herein in the context of molecular coatings of metal surfaces. Example embodiments are disclosed, including a metal substrate, to which are attached long-chain organic molecules, and the methods of creating such coated substrates. Such coated substrates have the advantage that they may be hydrophobic, thus repelling water and resisting corrosion from the environment. Coated metals according to the present disclosure may be useful many ways, just one example of which is in increasing the useful lifespan of metals exposed to air, water, or corrosive chemicals. Such coated metals may also, for example, enhance the biocompatibility of metallic tools and prostheses in contact with bodily fluids and tissues, including surgical tools and devices, both invasive and non-invasive. They may also be used to reduce the adherence of unwanted fluids, microbes, and biofilms, which could lead to cross-contamination in the medical environment.

Those of ordinary skill in the art will understand that the following detailed description is illustrative only and is not intended to be in any way limiting. Other embodiments of the present inventions will readily suggest themselves to such skilled persons having the benefit of this disclosure, in light of what is known in the relevant art, such as the art of material sciences, chemistry, chemical engineering, environmental chemistry, electronics, physics, nanotechnology, medicine, and other related areas. Reference will now be made in detail to exemplary implementations of the present inventions as illustrated in the accompanying drawings.

In the interest of clarity, not all of the routine features of the exemplary implementations described herein are shown and described. It will of course, be appreciated that in the development of any such actual implementation, numerous implementation-specific decisions must be made in order to achieve the specific goals of the developer, such as compliance with application and business-related constraints, and that these specific goals will vary from one implementation to another and from one developer to another. Moreover, it will be appreciated that such a developmental effort might be complex and time-consuming, but would nevertheless be a routine undertaking of engineering for those of ordinary skill in the art having the benefit of this disclosure.

Throughout the present disclosure, relevant terms are to be understood consistently with their typical meanings established in the relevant art. However, without limiting the scope of the present disclosure, further clarifications and descriptions are provided for relevant terms and concepts as set forth below:

Oxidation has its normal and customary meaning in the field of chemistry, and includes, among other things, the addition of oxygen, the removal of hydrogen, or the removal of electrons. Surface oxidation includes oxidation on or near a solid surface, including various forms of corrosion, such as the formation of layers of oxides or rusting. Surface oxidation may involve the removal of electrons from the surface of the solid. Therefore, depending upon the environment into which the surface is placed, surface oxidation may form materials at the surface other than oxides, such as fluorides, chlorides, bromides, nitrates, or other products of oxidation reactions known by those of ordinary skill in the art. An oxidizing agent is a material that can oxidize other materials, including a solid surface, typically by accepting electrons. Oxidizing agents may be either organic or inorganic. They may be solid, liquid, gas, or plasma. Examples of oxidizing agents include, among other things, oxygen, chlorine, bromine, ionized gasses and plasmas, radicals, peroxides, persulfates, perfluorides, permanganates, periodates, perchlorates, chromate, oxides of sulfur, oxides of nitrogen, and numerous other chemicals which are known in the art as oxidizing agents. Oxidizing agents may also include mixtures of oxidizing agents, or oxidizing agents mixed with other substances.

As used herein, and as may be generally understood, corrosion is a term that refers to an unwanted change in the properties of a solid surface due to reaction with its environment. Corrosion may take many forms, including surface oxidation, surface reduction, or other reactions such as the degradation of a surface due to ultraviolet light, loss of biocompatibility due to reactions with bodily fluids, biofouling, degradation due to living organisms such as bacteria or barnacles, and the like. Corrosion resistance indicates the ability of a surface to withstand or resist the corrosive effects of a particular environment. There are many tests for measuring corrosion resistance, depending upon the type of surface and the type of environment to which it is exposed. For example, ASTM International, Committee G01 on Corrosion of Metals has set forth one industry standard test for measuring certain types of corrosion resistance of coated metal surfaces, designated as ASTM-B 117. This test involves exposing a surface to a salt spray or fog, and determining the number of hours that the surface can withstand or resist corrosion. A longer time period, measured in hours, under this test indicates greater corrosion resistance to neutral salts than a shorter time period. See, e.g., the Annual Book of ASTM Standards, Designation: B 117-73. The longer a coating is capable of enduring such salt spray (measured by number of hours), the stronger its ability to resist corrosion by neutral salts. Another industry standard test for measuring corrosion resistance of coated metal surfaces is designated as ASTM-G 85, and measures the length of time a surface can withstand or resist the corrosive effects of a sulfur dioxide gas spray at a pH value of about 2.5. For better results, the ASTM-B 117 and ASTM-G 85 tests typically require careful adherence to the procedures and apparatus prescribed by ASTM International. In addition to the ASTM-B 117 or the ASTM-G 85 tests, there may be other known measures of corrosion resistance.

Hydrophobicity, as used herein and as generally understood by those of ordinary skill in the art, refers to a property of a substance in which it repels water, or where contact and/or mixing with water is energetically unfavorable. Hydrophobic surfaces may be characterized by the high contact angle (also called "wetting angle") that the solid surface makes with the liquid-vapor interface of a drop of water or aqueous solution. Contact angles may be measured by several equivalent methods known in the art, including optical means or the measurement of wetting force. Higher contact angles, measured from 0 up to 180 degrees, indicate a higher degree of hydrophobicity. The more hydrophobic a surface is, the more strongly the surface repels water, and the less likely water and aqueous solutions will make contact or prolonged contact with the surface. Thus, hydrophobicity reduces the opportunity for corrosion by oxygen, oxidizing agents, and other reactive materials that might be dissolved in water or otherwise carried to the surface by the presence of water.

As typically known, aprotic solvents are those not containing an ionizable hydrogen atom. Aprotic solvents do not normally donate protons, but may still, in some cases, react with bases. Non-limiting examples of aprotic solvents include ethyl acetate, propyl acetate, butyl acetate, amyl acetate, dimethyl sulfoxide, dimethyl acetamide, dimethyl formamide, ethylene carbonate, hexamethyl phosphoramide, tetramethyl urea, liquid or liquefied hydrocarbons, and halogenated solvents such as carbon tetrachloride and chloroform, to name a few.

Furthermore, a Group VIIIB element is typically recognized as a transition metal element located in the 8th, 9th, and 10th columns of a standard periodic table, which includes iron, copper, nickel, ruthenium, rhodium, palladium, osmium, indium, and platinum.

A number of possible advantages and attributes may be recognized from the disclosure herein and from practice of the invention. For example, it may be possible to provide a chemically-bonded coating on a metal surface which is hydrophobic and thereby protects the surface against corrosion and other unwanted reactions with the environment. It also may be possible to provide methods for creating such chemically-bonded coatings on metal surfaces.

FIG. 1 illustrates an embodiment of a metal surface coated with long-chain organic compounds, in which the long-chain organic groups 1 are chemically bound to the metal surface 2 by a carboxylic acid linkage 3. Long-chain organic groups 1 are organic chemical groups containing a plurality of carbon atoms. Each long-chain organic group 1 may include either a linear hydrocarbon chain or a branched carbon chain, and it may contain one or more functional groups. As an example, the hydrogen atoms in a hydrocarbon chain may optionally be substituted with halogens such as fluorine, chlorine, or bromine. The hydrocarbon chain may also optionally contain double or triple bonds between carbon atoms. In one embodiment, the hydrocarbon chains may range in length from 10 to 30 carbon atoms for unbranched carbon chains, and from 10 to 40 carbon atoms for branched chains. Preferably, the length of the carbon chain is between 12 and 20 atoms long.

The long-chain organic group 1 is chosen for its ability to remain largely inert when exposed to the particular environment where the surface will be placed, and to sufficiently cover and protect the metal surface 2. Those of skill in the art will recognize that the organic group 1 need not be entirely inert to all chemical reactions, so long as they are resistant to those reactions that would be unwanted in the particular environment to which the coated surface will be exposed. Identifying the optimal organic group 1 may involve the application of ordinary and routine knowledge.

The long-chain organic groups 1 are attached to the metal surface 2 via a chemical bond 3 between the metal 2 and a polar functional group on the long-chain organic group 1. In one embodiment, the polar functional group for attaching a long-chain organic group to a metal may be a COO— (carboxylate) group attached at or near the end of the long-chain organic group 1. In a preferred embodiment, the long-chain organic group is a fatty acid, and is attached to the metal via the COO— group at one of its ends. One fatty acid suitable for use in the present disclosure is palmitic acid, which has the formula $CH_3(CH_2)_{14}COOH$. Numerous other long-chain organic groups, and in particular, numerous other fatty acids and their mixtures may be used in a similar way to produce a resistance to the corrosion of the metal, when attached to the metal via a chemical bond. Non-limiting but illustrative examples of other fatty acids that may be used would include decanoic acid, hexadecanoic acid, and the like. Although not shown in FIG. 1, the long-chain organic groups 1 may optionally be cross-linked by a covalent linkage between functional groups on adjacent carbon chains.

Metal substrates 2 for use in FIG. 1 may include a wide range of metals that are reactive with the selected long-chain organic group. In particular, the metal may be, in one embodiment, a Group VIIIB element, such as iron, cobalt, or most preferably nickel. The metal may also include non-Group VIIIB metals such as copper, manganese, chromium, molybdenum, tungsten, or, preferably, zinc, aluminum, titanium, and tin. As would be clear to one of ordinary skill in the art in view of this disclosure, the metal may also include alloys or mixtures of various metals, or mixtures of metals with various components such as carbon, silicon, nitrogen, phosphorous, boron, and oxygen. As representative examples, the structure of FIG. 1 may be constructed upon a substrate 2 of nickel-phosphorus, nickel-copper, or nickel-tungsten alloys.

A number of methods may be used by which a metal coating such as that illustrated in FIG. 1 may be created. According to one preferred embodiment, a metal surface 2 that is intended to be protected from corrosion is cleaned thoroughly. This cleaning is intended to remove surface impurities such as oil, grease, smudge, grit, dust, microbes, biofilms, oxides, and other contaminants that could interfere with the bonding between a long-chain organic group 1 and the metal surface 2. Thorough cleaning also may have the benefit of making the surface more hydrophilic or wettable, which encourages the approach of polar functional groups which may be attached to the long-chain organic group 1, such as the polar carboxyl group at the end of a long-chain fatty-acid. For example, if palmitic acid is to be chemically attached to a metal, thoroughly cleaning the metal will remove surface contaminants that would block the approach of the palmitic acid anion, either by physically getting in the way, or by making the surface hydrophobic, thus preventing the polar group from binding to the metal.

There are several methods of cleaning a metal surface 2 in preparation for coating with a long chain organic compound 1. One method of cleaning a surface is to treat it with a strong alkaline solution, such as a solution of KOH, NaOH, or CsOH. For example, the metal may be immersed at an elevated temperature in a 0.8 Molar aqueous solution of KOH. Other strong alkaline solutions may also be used, and weaker alkaline solutions can be equivalent to stronger alkaline solutions if the metal remains immersed in the solution for a correspondingly longer period of time.

Another, possibly better method of cleaning is etching, which may include, for example, chemical etching by acids or other reactive solutions, plasma etching, etching by electron beams, and other etching methods known in the art. The preferred method of etching is electrochemical etching. According to this embodiment, the metal substrate 2 to be cleaned may be immersed in a strong alkaline solution and connected to the positive terminal of a direct current power supply for a period of time until the metal is sufficiently cleaned. The alkaline solution may preferably be KOH, NaOH, CsOH, or mixtures thereof, most preferably an aqueous solution of about 0.8 Molar KOH, but other concentrations and alkaline solutions may be used equivalently. Also, the alkali may be at a concentration of between about 0.5 and 15% of the aqueous solution by weight, and preferably about 5%. Electrochemical etching may also be conducted in a neutral salt solution such as, for example, sodium carbonate. Electrochemical etching may be conducted at a wide range of temperatures, including room temperature. Preferably, the etching may be conducted at an elevated temperature, preferably between 50° C. to 70° C., and preferably at approximately 60° C.; however, other temperatures may be used to equivalent effect. The electrochemical etching should be conducted at a voltage sufficient to allow for the etching to be accomplished in a reasonable time, but not so high that the etching is unacceptably rapid or the electrolyte solution is hydrolyzed. Preferably, the etching may be conducted between 2 and 6 volts, most preferably 3 volts. For some metallic surfaces, such as zinc and aluminum, electrochemical etching may not be required, and such materials may be cleaned with acid etching.

The etching should be conducted for a period of time long enough to effectively clean the surface, but not so long as to etch away too much of the surface. As a non-limiting example, to etch a nickel substrate in a 0.8 Molar aqueous solution of KOH at 60° C., using a voltage of 3 V, an etching time might be between approximately 1 to 10 minutes, typically 2 to 6 minutes, however, and preferably 3 to 4 minutes. A method of verifying that a metal surface has been sufficiently cleaned is to rinse the metal substrate with deionized water. A continuous thin water film, if retained on the cleaned surface after rinsing, may indicate that the surface is relatively hydrophilic and therefore thoroughly cleaned.

The efficiency of cleaning can also, optionally, be improved by the use of ionic and/or non-ionic surfactants. Surfactants may be added to a strong aqueous solution, if such a solution is used for cleaning, and may be added to an electrolyte solution during electrochemical etching. In a preferred embodiment, surfactants may include Triton X-100 or Bridge™ surfactants. Other suitable surfactants may include alkyl mono, di, or tri-alkyl ethanol amines, sodium lauryl sulfates, linear alkyl benzene sulfonic acid, or other equivalent surfactants known by those of skill in the art. The surfactant should be chosen so as not to cause unwanted side-reactions. The amount of surfactant may range from 0.001 to 0.5% surfactant by weight, and preferably 0.05%.

In creating the structure illustrated in FIG. 1, prior to attaching a long-chain organic group 1 to the metal substrate 2, the metal substrate 2 may be activated so that it becomes receptive to the organic groups. After washing with clean water, preferably deionized water, the substrate 2 may be activated by treatment with an oxidizing agent. Numerous oxidizing agents may be used for this purpose. Non-limiting examples of suitable oxidizing agents include metal peroxides, metal perchlorates, metal chlorates, metal persulfates, metal permanganates, metal dichromates, metal chromates, metal nitrates, metal perbromates, metal periodates, organic peroxidides, peroxy acids, and peroxy carboxylic acids, or mixtures thereof. A peroxy carboxylic acid having the formula RCOO(OH) may be used as an oxidizing agent, where R is preferably an alkyl or a substituted alkyl group having 1 to 25 carbon atoms. Preferably, the oxidizing agent may be a metal peroxide of Groups I or II, most preferably sodium peroxide. The oxidizing agent may be at a concentration of between 0.05 and 15% of the aqueous solution by weight, and preferably about 0.5%.

In a preferred embodiment, the substrate 2 may be activated in a mixture of an oxidizing agent and an alkali, and preferably sodium hydroxide and sodium peroxide. Also, the alkali may be at a concentration of between about 0.1 and 10% of the aqueous solution by weight, most preferably about 1.5%. The alkali may include sodium, potassium, or cesium hydroxide, or mixtures thereof. The oxidizing agent solution may be maintained at elevated temperature, preferably within the range of about 10° C. to about 60° C., most preferably 45° C. Then, the substrate 2 may be immersed in the oxidizing agent for a time sufficient to ensure that the surface is activated, preferably between about 20 seconds to about 1000 seconds, most preferably 200 seconds.

Attaching the long-chain organic group 1 to the metal substrate 2 as illustrated in FIG. 1 may be accomplished by immersing an activated metal substrate in a solution of the long-chain organic group to be attached. The long-chain organic group may be dissolved in a polar or non-polar organic solvent, preferably an aprotic solvent, and most preferably dimethyl acetamide (DMA). The concentration of the long-chain organic group should be sufficiently high that the organic groups will completely cover the substrate to be coated. Preferably, this concentration may be between about 5 to 50% by weight of solution, most preferably between 15 to 40%. As an example, a 2" by 2" area of nickel may be coated by immersing it in a solution of 60 grams palmitic acid dissolved in 200 milliliters of dimethyl acetamide (DMA). Other concentrations of the long-chain organic group are also appropriate, depending on the size of the substrate and the size and weight of the organic group. Preferably, the solvent may be held at an elevated temperature for sufficient time that the binding reaction between the organic groups and the surface goes to completion. For example, the substrate may be immersed in the solvent containing long-chain organic groups for between 2 to 10 minutes, and preferably 3 to 4 minutes. The temperature of the solvent may be between about 85° C. and 150° C., and preferably between 110° C. and 125° C. Other temperatures and reaction times may be used, as well, depending on factors that are well understood by those of skill in the art in view of the present disclosure.

After attaching a long-chain organic group 1 to a metal substrate 2, the substrate may be washed to remove solvents and any unbound long-chain organic groups, preferably with isopropyl alcohol, followed by acetone, and then deionized water. Other equivalent solvents and other sequences of washing may be applied, as well.

It may be verified that a successful binding of a long-chain organic group 1 to a metal substrate 2 has occurred by rinsing the substrate with water. If water rolls or slides off the substrate without substantially wetting the surface, it may be concluded that a hydrophobic surface has been created in accordance with this disclosure.

Figure 2:
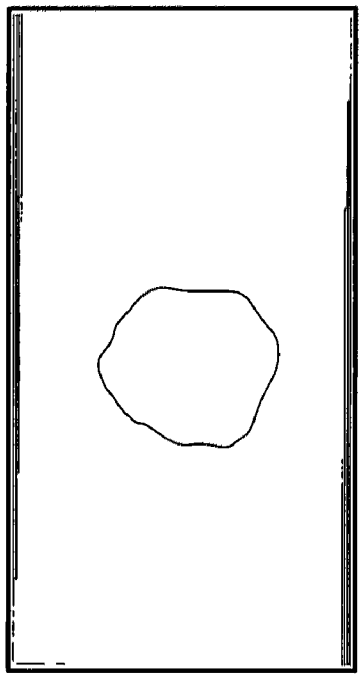
FIG. 2 is a photograph showing a nickel substrate without a molecular coating, as compared to a nickel substrate with a molecular coating of palmitate groups according to one embodiment of the present disclosure.
Figure 2:
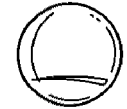

FIG. 2 is a photograph showing a nickel substrate 4 without a molecular coating, as compared to a nickel substrate 5 with a molecular coating of palmitate groups according to one embodiment of the present disclosure. As illustrated, the treated substrate containing a hydrophobic coating forms a bead on the surface, caused by a greater contact angle, indicating a greater degree of hydrophobicity compared to the untreated substrate.

EXAMPLE

The following example illustrates the creation of a nickel substrate according to FIG. 1 bound to palmitate groups. This example is illustrative of the disclosed embodiments, but does not limit them in any way:

As an initial step, a 2" by 2" coupon of nickel may be cleaned by dipping it in a 0.8 molar aqueous solution of potassium hydroxide at 40° C., and connected to the positive terminal of a 3 volt direct current power supply. The coupon is then electrolyzed for 3 minutes, after which it is washed with deionized water. Upon washing with water, a continuous thin water film is retained on the coupon, indicating that the nickel surface is thoroughly cleaned.

The coupon is then submersed in a solution containing a mixture of 3 grams sodium hydroxide and 0.8 grams sodium peroxide in 200 milliliters of deionized water. This solution is maintained at 45° C. and the substrate is submersed for 3 minutes. The substrate is then given several washings with deionized water. Upon rinsing with water, a thin film of water is retained on the substrate.

Subsequently, the nickel coupon is submersed in a solution of 60 grams palmitic acid dissolved in 200 milliliters of dimethyl acetamide (DMA) at 115° C. for 3 minutes. The coupon is then washed with isopropanol, acetone, and finally deionized water. Upon rinsing with deionized water, the water may be seen to form beads and slide off the surface, indicating the surface is hydrophobic. The treated surface 5 in FIG. 2 is an illustration of the hydrophobic properties of the present example.

Figure 3:
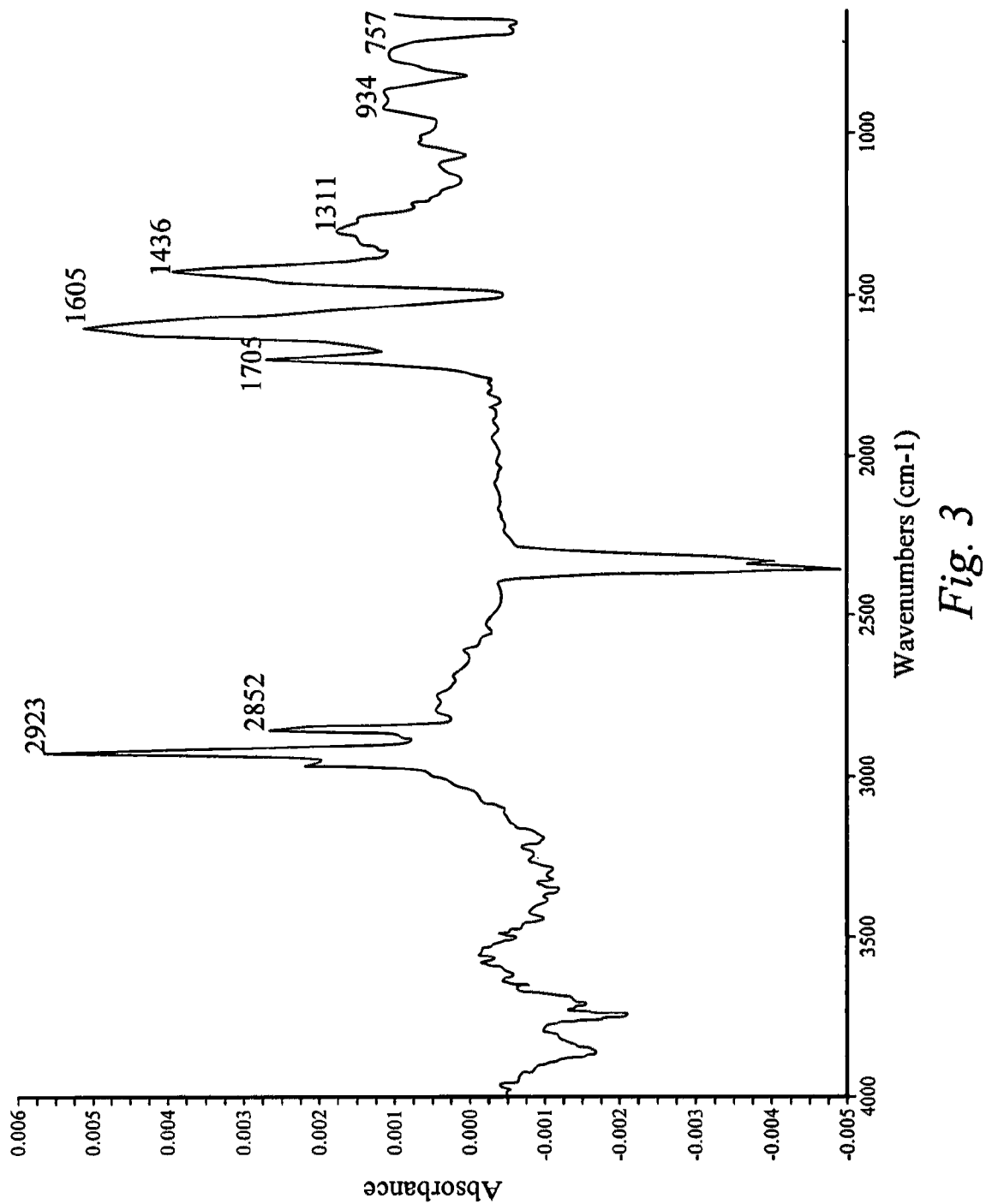
FIG. 3 is a graph obtained by Fourier transform infrared spectroscopy as applied to a nickel surface coated with palmitate groups under one embodiment of the present disclosure, showing the IR absorption signatures of the palmitate groups.

The treated surface can be analyzed by Fourier transform infrared spectroscopy according to standard analytical methods that will be familiar to one of skill in the art. FIG. 3 illustrates the graph that may be obtained, showing the IR signatures of palmitate groups bound to the surface of the nickel substrate.

Figure 4:
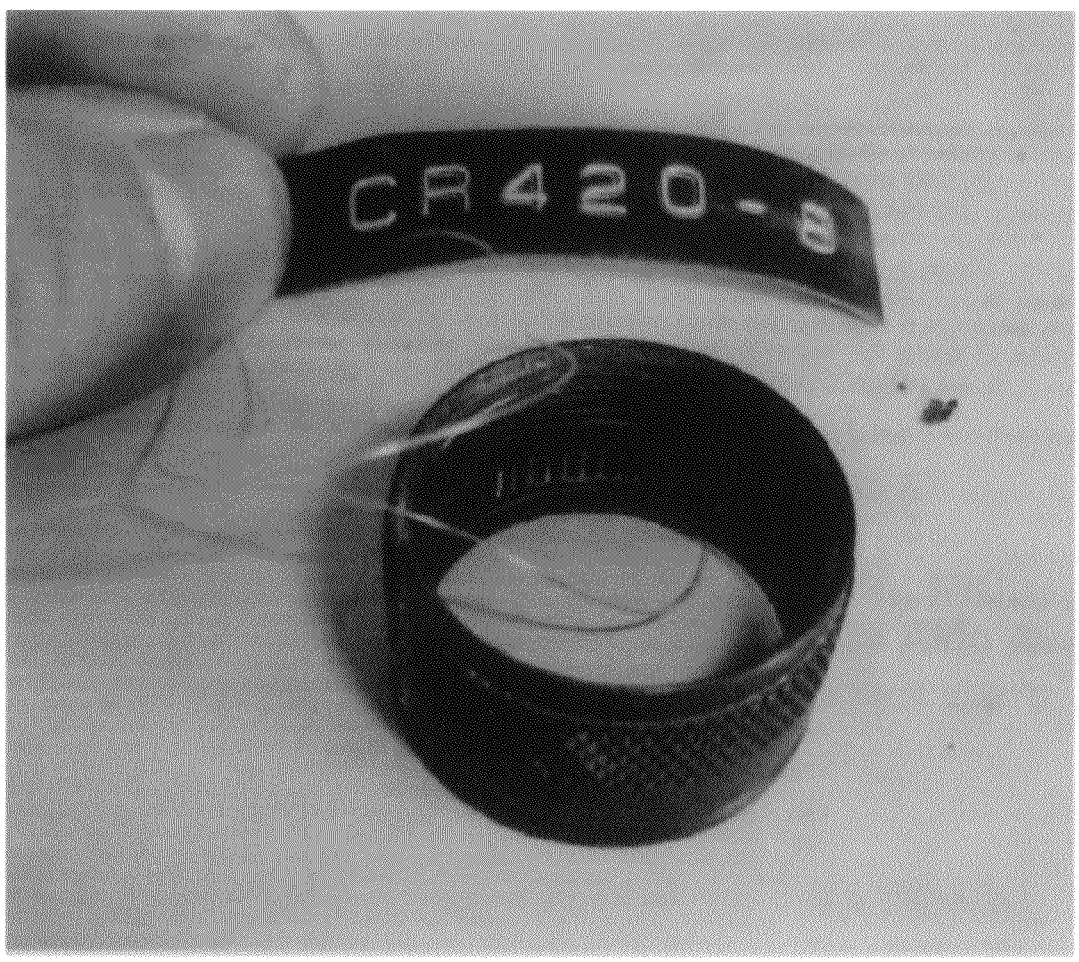
FIG. 4 shows a nickel ring coated according to the present disclosure illustrating some flaking of the coating but with no anticipated visible signs of corrosion of the metal substrate after being subjected to a standard corrosion resistance test, designated as ASTM G-85, in which the metal would be subjected to a sulfur fog for 384 hours.

The treated surface in the present example is shown to repel water while maintaining its surface electrical conductivity. The surface is subject to the standard neutral salt water test as governed by the ASTM B-117 procedure, and shown to withstand a neutral salt spray exposure for at least 500 hours. The surface is also subject to the standard sulfur fog test governed by ASTM G-85 procedure, and shown to withstand at least 384 hours. FIG. 4 illustrates a nickel ring coated according to the present example after being subject to the ASTM G-85 procedure, showing no anticipated visible signs of corrosion after 384 hours of sulfur fog.

While embodiments and applications have been shown and described, it would be apparent to those skilled in the art having the benefit of this disclosure that many more modifications than mentioned above are possible without departing from the inventive concepts disclosed herein. The invention, therefore, and the scope of the appended claims, should not be limited to the embodiments described herein.

What is claimed is:

1. A method for creating a hydrophobic coating on a metal substrate, comprising the steps of:
   cleaning a surface of the metal substrate;
   activating the surface by exposing it to an oxidizing agent;
   providing a plurality of organic molecular groups, each organic molecular group having a long-chain structure comprising a carbon backbone of at least 10 carbon atoms and a single carboxyl group;
   providing conditions wherein at least a portion of the plurality of organic molecular groups is selectively bound to the surface,
   wherein said portion of the organic molecular groups are bound to the metal surface by a chemical bond between the surface and the carboxyl group; and
   wherein the substrate after hydrophobic coating is electrically conductive.

2. The method of claim 1, wherein the organic molecular groups are fatty acid groups.

3. The method of claim 2, wherein the carbon backbone comprises at least 12 and no more than 20 carbon atoms.

4. The method of claim 1, wherein the cleaning step comprises the step of etching of the surface.

5. The method of claim 4, wherein the etching step comprises the step of electrochemical etching of the surface.

6. The method of claim 5, wherein the electrochemical etching step is conducted within a range of temperatures between about 40° C. and about 70° C.

7. The method of claim 1, wherein the surface of the metal substrate comprises at least 50 percent by weight of a Group VIIIB element.

8. The method of claim 7, wherein the Group VIIIB element is selected from the group consisting of iron and nickel.

9. The method of claim 1, wherein surface of the metal substrate comprises at least 50 percent by weight of an element selected from the group consisting of zinc, aluminum, titanium, and tin.

10. The method of claim 1, wherein the cleaning step comprises the step of exposing the substrate to a surfactant.

11. The method of claim 1, wherein the oxidizing agent comprises a metal peroxide.

12. The method of claim 1, wherein the binding step comprises the step of exposing the metal substrate to a solution comprising the organic molecular groups and an aprotic solvent.

13. The method of claim 1, wherein the binding step comprises the step of maintaining a temperature at the surface of between about 85° C. to about 150° C. for a predetermined period of time while the binding takes place.

14. The method of claim 13, wherein the temperature is between about 110° C. to about 125° C.

15. The method of claim 1, wherein none of the plurality of organic molecular groups contains a cross-link to any other of the plurality of organic molecular groups.

16. The method of claim 1, further comprising the step, performed after said step of providing conditions, of washing the surface to remove the portion of the organic molecular groups, if any, which remain unbound to the surface.

17. The method of claim 8, wherein the Group VIIIB element is nickel.

* * * * *